United States Patent
Stein et al.

(10) Patent No.: US 9,897,134 B2
(45) Date of Patent: Feb. 20, 2018

(54) LENGTH ADJUSTMENT FOR A DRIVE SHAFT

(71) Applicant: Spicer Gelenkwellenbau GmbH, Essen (DE)

(72) Inventors: Thomas Stein, Essen (DE); Manfred Meineke, Witten (DE); Hamed Sarzaiem, Bochum (DE)

(73) Assignee: Spicer Gelenkwellenbau GmbH, Essen (DE)

(*) Notice: Subject to any disclaimer, the term of this patent is extended or adjusted under 35 U.S.C. 154(b) by 0 days.

(21) Appl. No.: 15/378,269

(22) Filed: Dec. 14, 2016

(65) Prior Publication Data

US 2017/0167528 A1    Jun. 15, 2017

(30) Foreign Application Priority Data

Dec. 15, 2015    (EP) .................................... 15200280

(51) Int. Cl.
   *F16C 3/03*     (2006.01)
   *F16D 3/18*     (2006.01)
   (Continued)

(52) U.S. Cl.
   CPC ................. *F16C 3/03* (2013.01); *F16D 3/06* (2013.01); *F16D 3/185* (2013.01); *F16D 3/26* (2013.01);
   (Continued)

(58) Field of Classification Search
   CPC ..... F16C 3/03; F16D 3/06; F16D 3/18; F16D 3/185; F16D 3/26; F16D 2001/103;
   (Continued)

(56) References Cited

U.S. PATENT DOCUMENTS 5,643,092 A * 7/1997 Girguis ................ F16D 3/2237
                                              403/359.5
5,645,366 A * 7/1997 Ishibashi ................ F16C 3/035
                                              403/357

(Continued)

FOREIGN PATENT DOCUMENTS

DE    1081286      5/1960
DE    1081286 B    5/1960

(Continued)

OTHER PUBLICATIONS

JP Office Action of Application No. 2016-243288 with English translation, dated Apr. 10, 2017.

(Continued)

*Primary Examiner* — Josh Skroupa
(74) *Attorney, Agent, or Firm* — Marshall & Melhorn, LLC

(57) ABSTRACT

A length adjustment for a drive shaft, wherein the length adjustment has the following: a first rotary element with a first longitudinal toothing and a second rotary element with a second longitudinal toothing. The first longitudinal toothing and the second longitudinal toothing mesh with each other and are axially displaceable to each other. In an end portion of the first rotary element a tooth gap between two longitudinal teeth of the first longitudinal toothing is obstructed. The radial height of a longitudinal tooth of the second longitudinal toothing is reduced relative to the residual longitudinal teeth such that only the longitudinal tooth reduced in radial height can be axially inserted into the obstructed tooth gap. The tooth gap is obstructed by a locking portion of the first rotary element, produced by forming or a material connection a pin resting in a bore of the first rotary element. The locking portion or the pin is arranged in the tooth gap or in axial extension to the tooth gap.

6 Claims, 2 Drawing Sheets

(51) Int. Cl.
*F16D 3/06* (2006.01)
*F16D 1/10* (2006.01)
*F16D 3/26* (2006.01)

(52) U.S. Cl.
CPC .... *F16D 2001/103* (2013.01); *F16D 2300/12* (2013.01); *Y10T 403/7033* (2015.01)

(58) Field of Classification Search
CPC ......... F16D 2300/12; Y10T 403/32467; Y10T 403/32475; Y10T 403/32491; Y10T 403/32508; Y10T 403/32524; Y10T 403/7033; Y10T 403/7035
USPC ......... 403/109.1, 109.2, 109.4, 109.6, 109.8, 403/359.5, 359.6; 464/162
See application file for complete search history.

(56) References Cited

U.S. PATENT DOCUMENTS 7,789,779 B2 * 9/2010 Faust ..................... F16H 55/56
474/18
2004/0135320 A1 7/2004 Schultze

FOREIGN PATENT DOCUMENTS

| DE | 2849541 A1 | 5/1980 |
|---|---|---|
| EP | 1384923 A1 | 1/2004 |
| FR | 1374262 A | 10/1964 |
| GB | 2042126 A | 9/1980 |
| GB | 2191267 A | 12/1987 |
| JP | 51-2053 | 2/1976 |
| JP | 63106425 A | 5/1988 |
| JP | 8135647 A | 5/1996 |
| WO | 2005057038 A1 | 6/2005 |

OTHER PUBLICATIONS

Machine-generated English Translation of DE1081286, obtained via Espacenet Patent Search (URL: http://worldwide.espacenet.com/?locale=en_EP).

Machine-generated English Translation of JPH08135647, obtained via Espacenet Patent Search (URL: http://worldwide.espacenet.com/?locale=en_EP).

Abstract of corresponding document No. GB2191267, obtained via Espacenet Patent Search (URL: http://worldwide.espacenet.com/?locale=en_EP).

* cited by examiner

LENGTH ADJUSTMENT FOR A DRIVE SHAFT

CROSS-REFERENCE TO RELATED APPLICATION

This application is claiming the benefit, under 35 U.S.C. 119(a), of the European Patent Application which was granted Serial No. 15200280.4 and filed on Dec. 15, 2015, the entire disclosure of which is hereby incorporated by reference.

FIELD OF INVENTION

The invention relates to a length adjustment for a drive shaft, wherein the length adjustment has a first rotary element with a first longitudinal toothing and a second rotary element with a second longitudinal toothing. The first longitudinal toothing and the second longitudinal toothing mesh with one another and are axially displaceable to each other, so that a torque can be transmitted between the two rotary elements and a displacement relative for length adjustment is possible. In an end portion of the first rotary element a tooth gap between two longitudinal teeth of the first longitudinal toothing is obstructed. Furthermore, the radial height of one longitudinal tooth of the second longitudinal toothing is reduced relative to the residual longitudinal teeth of the second longitudinal toothing such, that only the longitudinal tooth reduced in radial height can axially be inserted into the obstructed tooth gap of the first longitudinal toothing.

BACKGROUND OF INVENTION

Such a length adjustment is known from DE 1 081 286 B. To ensure a predetermined mutual angle position of the two rotary elements to each other during the assembly of the rotary elements, at an end of the first rotary element an insert is mounted, which engages with a projection in a spline groove of the longitudinal toothing, which is formed as a splined shaft toothing. A longitudinal tooth of the second rotary element is removed. During the assembly of the two rotary elements in one another, i.e. during the axial inserting of the two longitudinal toothings into one another, no longitudinal tooth of the second rotary element can be inserted into the spline groove with the insert. Only in the one angle position, in which the splined groove with the insert and the removed tooth of the second rotary element are arranged at the same angle to each other, the rotary elements can be connected to each other or can be inserted into one another. The insert is in this case formed as a spring wire clamp which is formed U-like and has two parallel projections, which are connected to each other via an intermediate piece. One of the parallel projections engages in the spline groove. The other parallel projection is inserted into a central bore of the first rotary element, which is formed as a journal.

It is disadvantageous that a separate component, which is easily removable and thus easy to loose, is provided, which furthermore, represents a significant additional mass, which leads to imbalances.

BRIEF SUMMARY OF INVENTION

The object of the present invention is, to provide a length adjustment for a drive shaft, which is simply structured and causes an as small as possible imbalance.

The object is met by a length adjustment named above, wherein said tooth gap is obstructed by a locking portion of the first rotary element, produced by forming or by a material connection, or by a pin, which rests in a bore of the first rotary element, wherein the locking portion or the pin is arranged in the tooth gap or in axial extension to the tooth gap.

If the locking element is produced by forming, no additional mass is added to the first rotary element, which has an advantageous effect on imbalances. When providing a locking element, which is connected by means of material connection to the first rotary element, only a very small additional mass is applied in comparison with the state of the art. The solution with a pin, which rests in a bore of the first rotary element, leads also only to a small additional mass, as by forming the bore into the first rotary element initially mass is removed, which is then substituted by the pin again, and as the pin is formed projectingly, only a small additional mass is added.

Furthermore, it is a very simple measure, to ensure an assembly only in one angle position, wherein even when a separate element is provided, a protection against loss is ensured.

The longitudinal tooth reduced concerning its radial height can be reduced across its total radial height, so that no longitudinal tooth is present any more or can be reduced only partially in the radial height, i.e. shortened.

In this case, the reduced longitudinal tooth of the second toothing can be formed such, that during a torque transmission between the first longitudinal toothing and the second longitudinal toothing the tooth gap comes into abutment with one of the longitudinal teeth forming the locked tooth gap. Thus, the reduced longitudinal tooth participates in the torque transmission, which leads to a more balanced loading of the longitudinal teeth along the circumference.

Several tooth gaps can be obstructed and several longitudinal teeth can be reduced in the radial height. Preferably, two diametrically opposite tooth gaps of the first longitudinal toothing are obstructed and that the radial height of two diametrically opposite longitudinal teeth of the second longitudinal toothing is reduced. Thus, an assembly of the first rotary element and of the second rotary element in two different angle positions, which are rotated relative to each other by 180°, is possible. This can also be achieved such, that only one tooth gap of the first longitudinal toothing is obstructed and that two longitudinal teeth of the second longitudinal toothing are reduced in the radial height. Generally, also a different number of locked tooth gaps and longitudinal teeth, reduced in the radial height, can be provided, to enable an assembly in different angle positions.

In drive shafts in the form of universal joint shafts, the assembly in exactly two angle positions, which are off-set to each other by 180° is preferred. In a length adjustment for a drive shaft, the first rotary element is connected to a first joint yoke of a first universal joint and the second rotary element is connected to a second joint yoke of a second universal joint. To ensure a uniform rotational movement it is necessary that the two joint yokes are arranged mirror-invertedly or off-set to each other by 90°. This can be achieved such, that the first rotary element and the second rotary element are connectable to each other for example in two angle positions, off-set by 180° to each other.

The bore is formed as a threaded bore and the pin is formed as a threaded pin. Thus a simple assembly of the pin in the threaded bore is achieved. Generally however it is also possible, that a pin is inserted into a threaded bore with a force fit.

Preferably it is provided, that in an end portion of the first rotary element the tooth gap is obstructed by an indentation into an end face or by a pin, which rests in an axial bore in the end face. It is especially advantageous, if the longitudinal teeth of the first longitudinal toothing extend from the end face. Especially forming an indentation into the end face, forcing material radially outwards, to obstructed a tooth gap of the first longitudinal toothing, is seen as advantageous, as no additional elements and no additional masses have to be mounted on the first rotary element and the obstruction of the one tooth gap is simply achievable in one further simple process step.

In an embodiment of the invention the first rotary element is a shaft journal and the first longitudinal toothing is an outer longitudinal toothing. Furthermore, the second rotary element is a hub sleeve and the second longitudinal toothing is an inner longitudinal toothing. The inner longitudinal toothing of the hub sleeve is produced by cold pressing. In this case it is especially advantageous, when the radial height of two diametrically opposite longitudinal teeth of the second longitudinal toothing is reduced, so that during the cold pressing along the longitudinal axis of the hub sleeve no transversal forces are produced transversally to the longitudinal axis, which could lead to an off-set course of the cold pressing step.

Furthermore, the object of the invention is met by a drive shaft with a length adjustment as described above, wherein the drive shaft has a first joint, rigidly connected to the second rotary element and a second joint, rigidly connected to the first rotary element.

BRIEF DESCRIPTION OF THE SEVERAL VIEWS OF THE DRAWING

A preferred embodiment of a drive shaft with a length adjustment according to the invention is described in detail in the following with reference to the drawings.

DETAILED DESCRIPTION OF THE INVENTION

Figure 1:
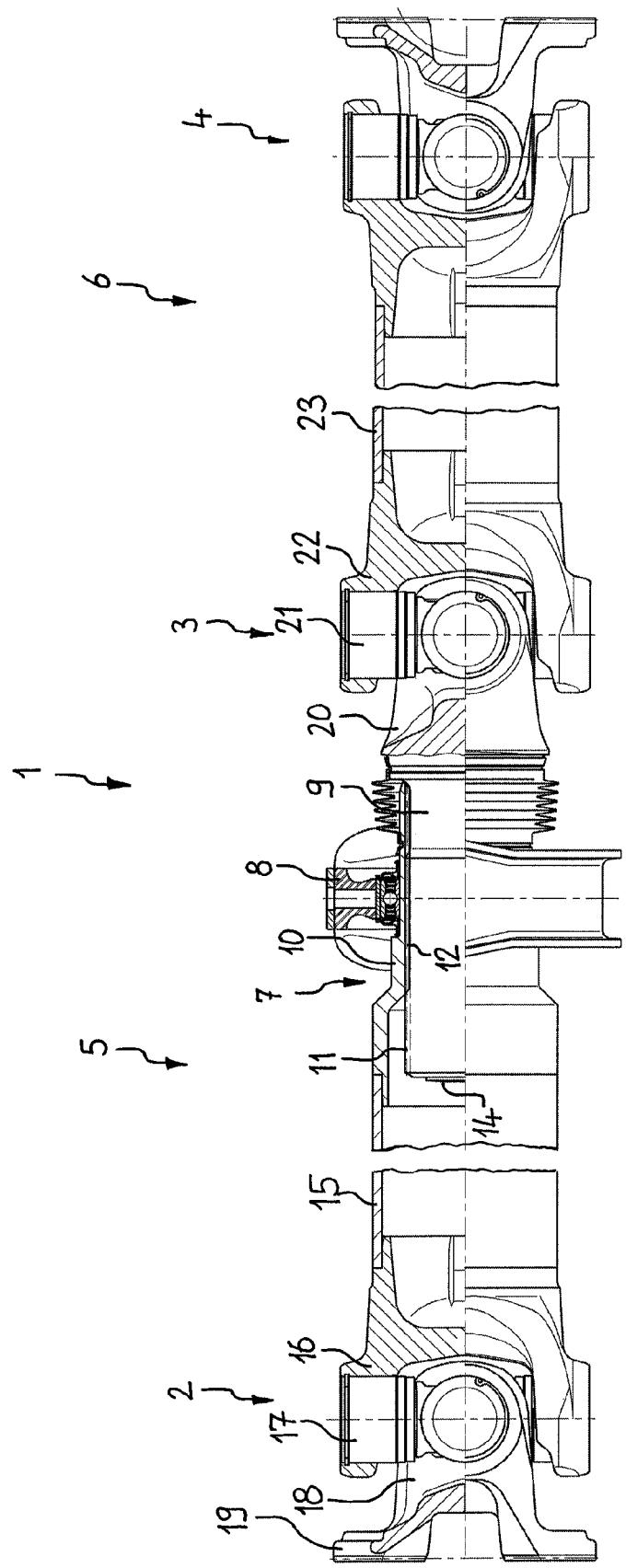
FIG. 1 is a longitudinal sectional view of a drive shaft with a length adjustment according to the invention.

FIG. 1 shows a drive shaft 1 with three joints, namely a first joint 2, a second joint 3 and a third joint 4. All joints 2, 3, 4 are universal joints and separate the drive shaft 1 into a first drive shaft portion 5 between the first joint 2 and the second joint 3 and a second drive shaft portion 6 between the second joint 3 and the third joint 4.

In the first drive shaft portion 5 a length adjustment 7 is provided, so that the first joint 2 and the third joint 5 can be axially displaced to each other along a longitudinal axis L. The second drive shaft portion 6 is not adjustable in length.

In the area of the length adjustment 7, the drive shaft 1 is supported via a support bearing 8.

The length adjustment 7 has a first rotary element 9 in form of a shaft journal as well as a second rotary element 10 in form of a hub sleeve. The hub sleeve 10 rests in this case on the journal 9 and is held displaceably in axial direction. For this, the shaft journal 9 has a first longitudinal toothing 11. The hub sleeve 10 has a second longitudinal toothing 12. The two longitudinal toothings 11, 12 are arranged complementary to each other and mesh in each other, so that a torque can be transmitted around the longitudinal axis and a displacing of the two rotary elements 9, 10 is ensured relative to each other in direction of the longitudinal axis L.

The first longitudinal toothing 11 has longitudinal teeth 13, which extend starting from an end face 14 of the shaft journal 9 and in axial direction. The first longitudinal toothing 11 is formed as an outer longitudinal toothing.

The second longitudinal toothing 12 has longitudinal teeth 24, which are formed complementary to the longitudinal teeth 13 of the first longitudinal toothing 11, wherein the second longitudinal toothing 12 is formed as an inner longitudinal toothing.

The hub sleeve 10 is rigidly connected to a tube 15, which is connected at an end facing away from the hub sleeve 10 to an inner yoke 16 of the first joint 2. The inner yoke 16 is connected via a cross 17 in an articulated manner to an outer yoke 18. The outer yoke 18 has a flange 19 for connecting the drive shaft 1 to a driven or driving component.

The shaft journal 9 of the length adjustment 7 is connected to a first yoke 20 of the second joint 3. The first yoke 20 is connected via a cross 21 in an articulated manner to a second yoke 22. The second yoke 22 is connected via a tube 23 to the third joint 4, wherein the third joint 4 can be connected to a driven or a driving element.

To ensure a uniform rotational movement at the element connected to the first joint 2 and at the element connected to the third joint 4, it has to be ensured, that the angles of articulation at the first joint 2 and at the third joint 4 are of the same size. Furthermore, the outer yoke of the first joint 2 and of the third joint 4 have to be aligned parallel to each other. Thus during the assembly of the length adjustment 7 it is important, that the first rotary element 9 and the second rotary element 10 can only be assembled in two angular positions.

Figure 2:
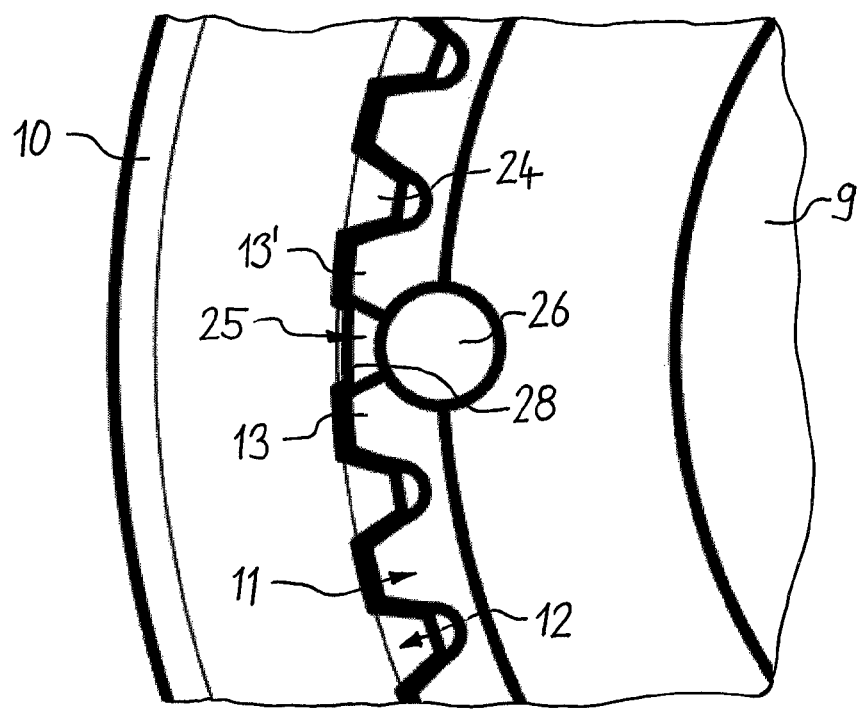
FIG. 2 is a cross-sectional view through the length adjustment along the sectional line II-II of FIG. 1.
Figure 3:
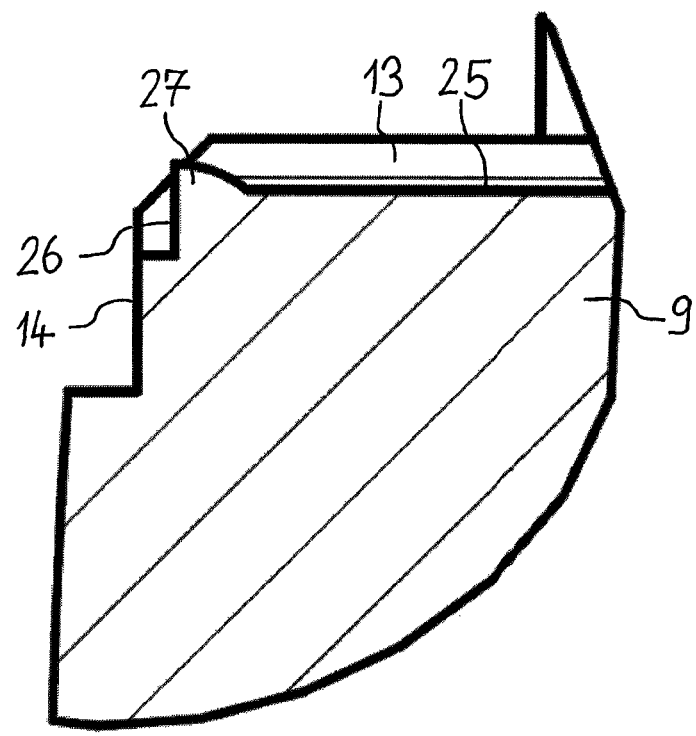
FIG. 3 is a portion of a longitudinal sectional view through a shaft journal of the length adjustment of FIG. 1.

In the present embodiment this is achieved such, that, as shown in FIGS. 2 and 3, an indentation 26 is worked into the end face 14 by forming. The indentation 26 is aligned, when seen in axial direction, with a tooth gap 25 between two longitudinal teeth 13, 13' of the first longitudinal toothing 11.

As especially visible in FIG. 3, a material accumulation is achieved radially outward by means of working the indentation 26 into the end face 14, which forms an obstructing portion 27, which is arranged between the longitudinal teeth 13, 13' of the tooth gap 25.

Generally it is also possible, that the indentation 26 is worked into an end face, which forms part of a cylindrical projection, to which the longitudinal teeth 13, 13' follow only with an axial distance to the end face. Essential is, that the locking portion 27 is aligned with the tooth gap 25 in axial direction.

The second longitudinal toothing 12 has an longitudinal tooth 28 reduced in the radial height. This shortened longitudinal tooth 28 has a smaller radial height than the residual longitudinal teeth 24 of the second longitudinal toothing 12. In this case, the radial height of the obstructing portion 27 is formed such, that the longitudinal teeth 24 of the second longitudinal toothing 12, which are not shortened, cannot be inserted axially into the tooth gap 25. During the assembly of the shaft journal 9 in the hub sleeve 10, thus, the longitudinal teeth 24, not shortened, would collide with the obstructing portion 27, whereby an assembly is prevented.

In contrast thereto, the shortened longitudinal tooth 28 has a radial height, which is so low, that the shortened longitudinal tooth 28 can be pushed over the obstructing portion 27.

In other words, the non-shortened longitudinal teeth 24 of the second longitudinal toothing 12 have a head circle diameter, which is smaller than the head circle diameter of the obstructing portion 27, whereas the head circle diameter of the shortened longitudinal tooth 28 is larger than the head circle diameter of the obstructing portion 27.

Generally it is also possible, that the obstructing portion 27 is arranged on the inner longitudinal toothing and the outer longitudinal toothing has a shortened longitudinal tooth.

In total two indentations 26 are provided in the end face 14, which are arranged diametrically opposite to each other. Equivalent thereto, two shortened longitudinal teeth 28 are provided, which are also arranged diametrically to each other. Thus, the shaft journal 9 and the hub sleeve 10 can be mounted in two angular positions, rotated by 180° to each other.

What is claimed is:

1. A length adjustment for a drive shaft, the length adjustment comprising:
    a first rotary element with a first longitudinal toothing and
    a second rotary element with a second longitudinal toothing,
    wherein the first longitudinal toothing and the second longitudinal toothing mesh with each other and are axially displaceable to each other,
    wherein in an end portion of the first rotary element a tooth gap between two longitudinal teeth of the first longitudinal toothing is obstructed, and
    wherein the radial height of a longitudinal tooth of the second longitudinal toothing is reduced relative to the residual longitudinal teeth such, that only the longitudinal tooth reduced in radial height can be axially inserted into the obstructed tooth gap,
    wherein said tooth gap is obstructed by a locking portion of the first rotary element, the locking portion produced by forming an indentation in an axial end face of the end portion of the first rotary element, such that the locking portion radially extends into the tooth gap
    wherein the locking portion is arranged in the tooth gap or in axial extension to the tooth gap.

2. The length adjustment according to claim 1, wherein the longitudinal tooth with reduced height of the second longitudinal toothing, is formed such, that during a torque transmission between the first longitudinal toothing and the second longitudinal toothing the longitudinal tooth with reduced height comes into abutment with one of the longitudinal teeth forming the obstructed tooth gap.

3. The length adjustment according to claim 1,
    wherein two diametrically opposite tooth gaps of the first longitudinal toothing are obstructed; and
    wherein the radial height of two diametrically opposite longitudinal teeth of the second longitudinal toothing is reduced.

4. The length adjustment according to claim 1,
    wherein the longitudinal teeth of the first longitudinal toothing extend from the end face.

5. The length adjustment according claim 1,
    wherein the first rotary element is a shaft journal and the first longitudinal toothing is an outer longitudinal toothing; and
    wherein the second rotary element is a hub sleeve and the second longitudinal toothing is an inner longitudinal toothing.

6. The length adjustment according to claim 5, wherein the inner longitudinal toothing of the hub sleeve is produced by means of cold pressing.

* * * * *